United States Patent
Miyashita

(10) Patent No.: US 6,731,912 B1
(45) Date of Patent: May 4, 2004

(54) PORTABLE TELEPHONE

(75) Inventor: Toshikazu Miyashita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/525,114

(22) Filed: Mar. 14, 2000

(30) Foreign Application Priority Data

Mar. 16, 1999 (JP) .......................................... 11-070597

(51) Int. Cl.⁷ ................................................ H04B 1/38
(52) U.S. Cl. .................. 455/90.2; 455/90.3; 455/575.1; 379/433.03; 379/434
(58) Field of Search ............................ 455/90.1, 550.1, 455/575.1, 90.2, 90.3; 379/433.01, 433.03, 434; D14/137, 138

(56) References Cited

U.S. PATENT DOCUMENTS

| | | | |
|---|---|---|---|
| 4,845,772 A | * 7/1989 | Metroka et al. ............... | 455/90 |
| 5,276,916 A | * 1/1994 | Pawlish et al. ............. | 455/575 |
| 5,715,311 A | 2/1998 | Sudo et al. | |
| 6,108,415 A | * 8/2000 | Andrea ................... | 379/433.03 |
| 6,118,986 A | * 9/2000 | Harris et al. .................. | 455/90 |

FOREIGN PATENT DOCUMENTS

| | | |
|---|---|---|
| EP | 0 854 535 A2 | 7/1998 |
| EP | 0 871 312 A1 | 10/1998 |
| GB | 2 201 861 A | 9/1988 |
| GB | 2 070 392 A | 9/1991 |
| JP | 4-2244 | 1/1992 |
| JP | 4-306036 | 10/1992 |
| JP | 6-237288 | 8/1994 |
| JP | 7-288568 | 10/1995 |
| JP | 8-32659 | 2/1996 |
| JP | 8-65367 | 3/1996 |
| JP | 9-215037 | 8/1997 |

OTHER PUBLICATIONS

Search Report dated May 25, 2000.

Japanese Office Action with English translation of pertinent portions dated Dec. 26, 2002.

* cited by examiner

*Primary Examiner*—Quochien B. Vuong
(74) *Attorney, Agent, or Firm*—Whitham, Curtis & Christofferson, P.C.

(57) ABSTRACT

A portable telephone formed of an integral casing including a speech reception portion provided in proximity to one end portion of the casing, and a speech transmission portion provided in proximity to the other end portion of the casing, the speech transmission portion including a movable portion having a unidirectional microphone therein which portion is disposed to have an angle adjustable with respect to the casing.

20 Claims, 6 Drawing Sheets

PORTABLE TELEPHONE

BACKGROUNDS OF THE INVENTION

1. Field of the Invention

The present invention relates to a portable telephone and, more particularly, to an improvement in a speech transmission portion in a portable telephone.

2. Description of the Related Art

As conventional portable telephones, structure presented are of two types, one having an integral casing and the other having two casings of the same configuration which are formed foldable with a hinge portion provided therebetween.

In portable telephones having an integral casing structure, a speech reception portion (receiver) and a speech transmission portion (microphone) are provided at the opposite end portions of the casing. On the other hand, portable telephones having two foldable casings commonly have a speech reception portion provided on one of the casings and a speech transmission portion provided on the other.

With a portable telephone having an integral casing, in particular, because of its small size, when a receiver is brought close to the position of an ear, a microphone will be positioned away from a mouth, making a voice to be transmitted lower in some cases.

In addition, because conventional portable telephones employ a nondirectional microphone, unless the microphone is properly disposed near a mouth, surrounding noise will be input to make a partner of telephone conversation have difficulty in hearing a speaker's voice.

Therefore, conventionally presented is a telephone having a casing provided with a drawable member (square poll), with one of a receiver and a microphone provided at the member and the other provided at the casing, thereby adjusting a distance between the receiver and the microphone to the positions of an ear and a mouth, as disclosed, for example, in Japanese Patent Laying-Open (Kokai) No. Heisei 6-237288.

According to the above-described conventional technique, however, because of a longitudinal drawable member (i.e. square poll) provided at a casing, the member being drawn might make the entire structure fragile. In addition, the drawn member might be caught by clothes etc., which makes the telephone breakable.

SUMMARY OF THE INVENTION

An object of the present invention is to provide, for a portable telephone having an integral casing, a structure which enables efficient input of a voice to be transmitted even when a speech transmission portion is not allowed to be proximate to a mouth, thereby allowing comfortable telephone conversation and which involves less breakage etc.

According to one aspect of the invention, a portable telephone formed of an integral casing, comprises

- a speech reception portion provided in proximity to one end portion of the casing, and a speech transmission portion provided in proximity to the other end portion of the casing,
- the speech transmission portion including a movable portion having a unidirectional microphone therein which portion is disposed to have an angle adjustable with respect to the casing.

Then, adjusting the angle of a movable portion to face a microphone toward a mouth enables efficient input of a voice to be transmitted to allow comfortable telephone conversation even when the microphone and the mouth are placed a little away from each other.

In addition, because of a structure in which the angle of a movable portion in block form housed in a housing concavity is adjusted, a portable telephone of a structure involving less breakage etc. can be provided as compared with that in which a longitudinal member is drawn.

In the preferred construction, the movable portion is provided turnably in a concavity formed in the casing, and angle adjustment of the movable portion causes the microphone to face toward a speaker's mouth.

In another preferred construction, with no adjustment made of an angle, the movable portion is disposed to have its outer surface substantially flush with an outer surface of the casing so as to cover the housing concavity.

In another preferred construction, the movable portion is formed to have a section in substantially isosceles triangular form.

In another preferred construction, the movable portion is formed to be spherical.

In another preferred construction, a brake mechanism is provided which brakes a turn of the movable portion at the time of adjustment of the angle of the movable portion.

In another preferred construction, the brake mechanism includes

- a plurality of engagement claws formed at fixed spacing in the direction of rotation around the axis at the rotational center provided in the movable portion,
- a stopper provided movably in the direction in which the stopper comes close to and goes away from any of the plurality of engagement claws provided on the casing side, and
- energizing means for energizing the stopper to the direction of engagement with the engagement claws.

In another preferred construction, the portable telephone further comprises a speech transmission signal turn-on means for detecting an angle adjustment being made of the movable portion whose angle has not been adjusted to turn on a transmission line of a speech transmission signal from the microphone.

In another preferred construction, the portable telephone further comprises off-hook means for detecting an angle adjustment being made of the movable portion whose angle has not been adjusted to connect a radio line off the hook.

In another preferred construction, the portable telephone further comprises mutiing means for suppressing the level of a voice to be transmitted when after an angle adjustment of the movable portion makes a radio line be connected off the hook to start telephone communication, the movable portion is returned to have its angle not adjusted.

In another preferred construction, the portable telephone further comprises a displacement mechanism for displacing the movable portion by a set angle of turn.

In another preferred construction, an operation portion is provided for activating the displacement mechanism to displace the movable portion.

In another preferred construction, the displacement mechanism includes driving means connected to a rotary shaft of the movable portion to turn the movable portion, and control means for controlling a turn of the driving means based on a set value of a set angle.

In another preferred construction, the portable telephone further comprises a displacement mechanism for displacing the movable portion by a set angle of turn, a first operation portion for setting an angle of turn of the movable portion for the displacement mechanism, and a second operation portion for activating the displacement mechanism to displace the movable portion, the displacement mechanism including driving means connected to a rotary shaft of the movable portion to turn the movable portion, and control means having setting means whose angle of turn is set by the first operation means to control a turn of the driving means based on a set value of the setting means.

According to another aspect of the invention, a portable telephone having a folding casing, wherein two casings are disposed to open and close with a hinge portion provided therebetween, a speech reception portion is provided on one casing and a speech transmission portion is provided on the other casing, and the one casing is turnably pivoted on the hinge portion by means of a rotary shaft which rotates in a backward direction around the axis orthogonal to a rotation axis of the hinge portion.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the following, embodiments of a portable telephone according to the present invention will be described in detail with reference to the drawings.

The portable telephone according to the present embodiment having an integral casing is structured to use a unidirectional microphone as a microphone of a speech transmission portion, as well as having a movable portion in block form with a microphone mounted thereon provided on the casing so as to have an adjustable angle, thereby enabling efficient input of a voice to be transmitted to realize comfortable telephone conversation through adjustment of the angle of the movable portion to face the microphone toward a mouth even when the microphone and the mouth are placed a little away from each other.

Figure 1:
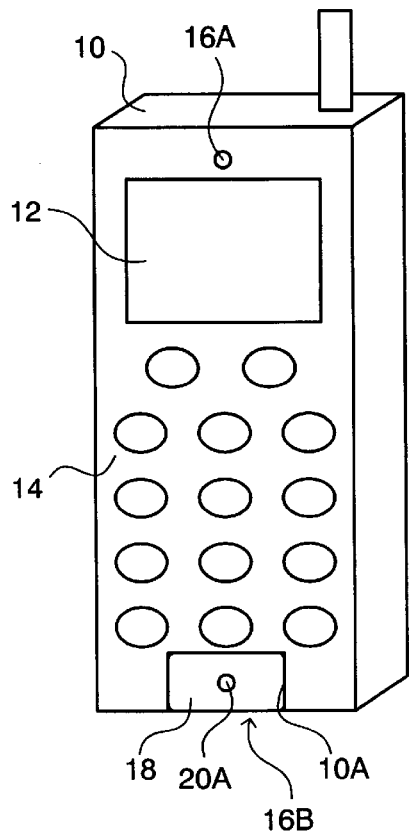
FIG. 1 is a perspective view showing an appearance of a portable telephone according to a first embodiment of the present invention, which shows a state where a speech transmission portion has its angle not adjusted.
Figure 2:
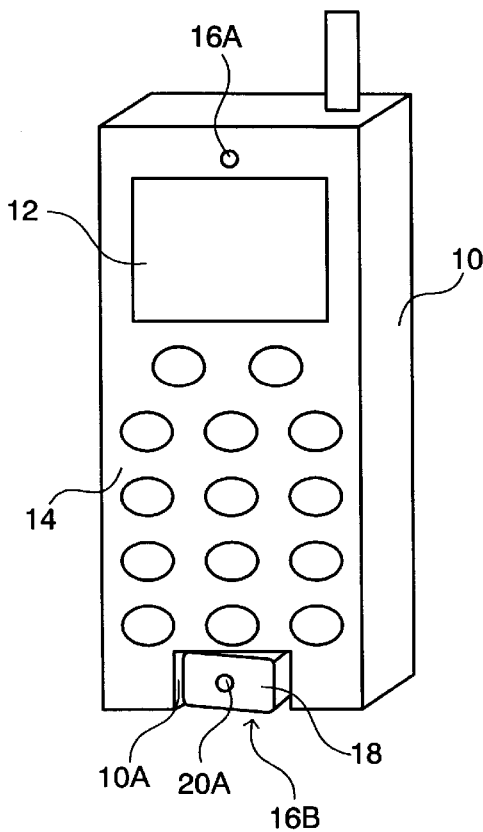
FIG. 2 is a perspective view showing an appearance of the portable telephone according to the first embodiment of the present invention, which shows a state where a speech transmission portion has its angle adjusted.

FIGS. 1 and 2 are perspective views showing an appearance of a portable telephone according to the first embodiment of the present invention, and FIG. 1 shows a state where a movable portion with a microphone for speech transmission has its angle not adjusted and FIG. 2 shows a state where the movable portion with the speech transmission microphone has its angle adjusted.

Figure 3:
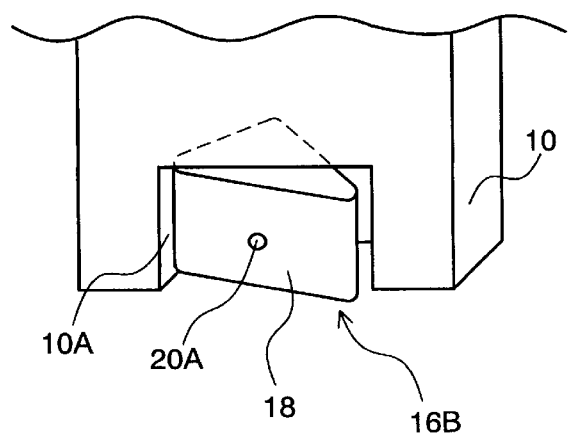
FIG. 3 is a partial perspective view showing a movable portion and its surrounding portion expanded at the portable telephone shown in FIG. 1.
Figure 4:
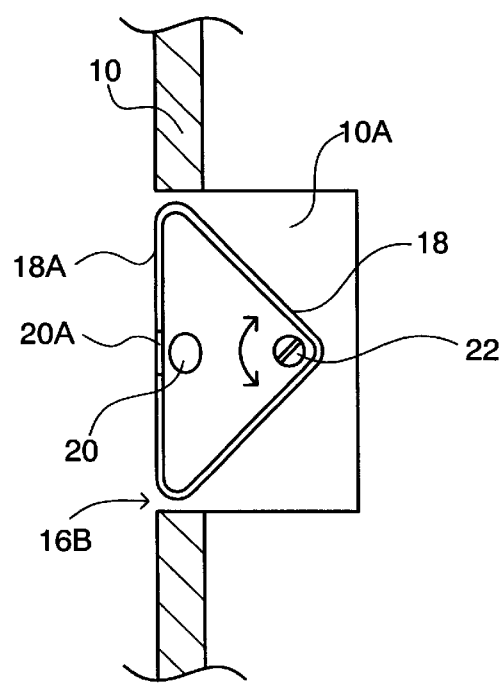
FIG. 4 is a partial cross sectional plan view showing the movable portion and its surrounding portion expanded at the portable telephone shown in FIG. 1.

FIG. 3 is a partial perspective view showing the movable portion and its surrounding portion expanded at the present portable telephone, while FIG. 4 is a partial cross sectional plan view showing the movable portion and its surrounding portion expanded at the present portable telephone.

As illustrated in FIGS. 1 and 2, the portable telephone of the present embodiment has an integral casing 10, and on the front side portion of which casing 10, an LCD display portion 12 and a key entry portion 14 are provided.

In addition, the telephone has a speech reception portion 16A having a built-in speaker which is disposed in the proximity of the upper edge portion of the casing 10 and has a speech transmission portion 16B formed as a movable portion 18 having a built-in microphone 20 which is disposed in the proximity of the lower edge portion of the casing 10.

The speech transmission portion 16B includes an open housing concavity portion 10A provided at the front side of the casing 10 in which the movable portion 18 is housed and arranged.

As illustrated in FIG. 4, the movable portion 18 is formed to be substantially an isosceles triangle whose sectional configuration is round. With no adjustment made of the angle, an outer surface 18A of the movable portion 18 is arranged to be substantially flush with the outer surface of the casing 10 so as to cover the opening of the housing concavity portion (space) 10A.

Then, on the outer surface 18A of the movable portion 18, a sound collecting hole 20A of the built-in microphone 20 is provided. In the present embodiment, used as the microphone 20 is a microphone having unidirectivity which is arranged to have directivity in the vertical direction with respect to the outer surface 18A of the movable portion 18.

The movable portion 18 is disposed in the housing concavity portion 10A turnably on a rotary shaft 22 provided vertically in the housing concavity portion 10A of the casing 10. By the operation of turning the movable portion 18 to adjust its angle (direction), the outer surface 18A on which the sound collecting hole 20A of the microphone 20 is disposed can be kept to face to a speaker's mouth.

The rotary shaft 22 of the movable portion 18 is provided with a brake mechanism for braking a rotational displacement of the movable portion 18 to maintain a desired angle at the time of angle adjustment of the movable portion 18.

Figure 5:
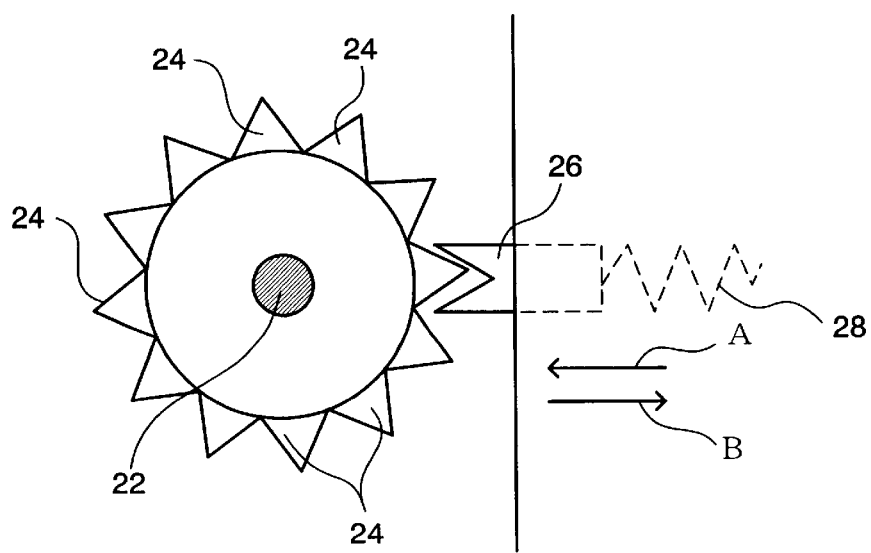
FIG. 5 is a plan view showing a specific example of a brake mechanism in the portable telephone illustrated in FIG. 1.

FIG. 5 is a plan view showing a specific example of this brake mechanism.

The brake mechanism is structured to have, in the movable portion 18, a plurality of engagement claws 24 formed at fixed spacing (e.g. at the spacing of 15 degrees) in the direction of rotation around the axis at the rotational center of the movable portion 18, and within the casing 10, a forked stopper 26 to be engaged with (fit in) any of the plurality of engagement claws 24 and a compression coil spring 28 to energize the stopper claw 26 toward the engagement claws 24 (in the direction of the arrow A in FIG. 5). The stopper 26 is disposed movably in the directions of the arrows A and B in the figure.

In this brake mechanism, by the operation of turning the movable portion 18 by user's (speaker's) finger, the stopper 26 is pushed by the engagement claw 24 to withdraw against the spring force of the compression coil spring 28, whereby the movable portion 18 is allowed to turn.

When the operation of turning the movable portion 18 is stopped, the stopper claw 26 advances by the spring force of the compression coil spring 28 to engage with the engagement claw 24, thereby naturally regulating a turn of the movable portion 18 to maintain its state.

In such a brake mechanism as mentioned above, engagement claws 24 may be disposed at smaller spacing and braking may be achieved not by engagement of claws but by friction.

Also in the present embodiment, the movable portion 18 has a function as a switch for turning on a transmission line of a speech transmission signal and executing off-hook.

Figure 6:
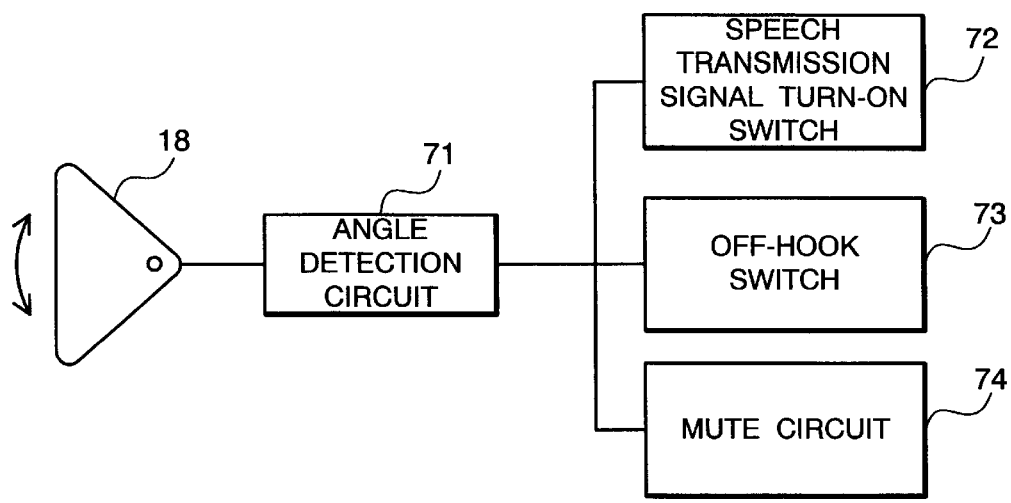
FIG. 6 is a block diagram showing a structure for turning on a speech transmission signal and conducting off-hook linking with the movable portion.

Structure of the above function is shown in FIG. 6. When the movable portion 18 changes its direction by the turning operation, the angle detection circuit 71 detects the changed state, whereby a speech transmission signal turn-on switch 72 turns on/off a transmission line of a speech transmission signal and an off-hook switch 73 conducts off-hook.

By these switches, various circuit operations are executed according to a state of the movable portion 18.

First, the angle detection circuit 71 detects a change from a state where the movable portion 18 has its angle not adjusted (initial state: the state where the outer surface 18A of the movable portion 18 is substantially flush with the outer surface of the casing 10) to a state where the same has its angle adjusted and the speech transmission signal turn-on switch 72 automatically turns on the transmission line of a speech transmission signal from the microphone 20 (speech transmission signal turn-on function).

Also, the angle detection circuit 71 detects an angle adjustment being made of the movable portion 18 whose angle has not been adjusted and the off-hook switch 73 makes the radio line be connected off the hook (off-hook function).

More specifically, at the arrival of a call, when a user recognizes the call arrival by a rumble of a ring tone or the like, just by angle adjustment through the operation of turning the movable portion 18, the line of the speech transmission signal is turned on, while the arrival call can be responded off the hook, whereby the line is connected to the other party's telephone to enable communication.

At the time of making a call, just the angle adjustment through the operation of turning the movable portion 18 turns on the line of the speech transmission signal, as well as attaining a state where a call can be made off the hook to the radio line, at which state dial entry etc. enables call-up of the other party's telephone.

In other words, the operation of turning the movable portion 18 constitutes preparation operation for conducting telephone conversation at the reception of a call and preparation operation for dialing at the time of making a call, resulting in saving other key operations.

When responding to an arriving call without adjustment of the angle of the movable portion 18 or when conducting operation of making a call, a transmission line of a speech transmission signal is turned on and off-hook is conducted by their corresponding key operations which are the same as those of conventional operation.

In addition, as shown in FIG. 6, the present embodiment is provided with a mute circuit 74 (muting function) for suppressing the level of a voice to be transmitted when after entering the state of conducting telephone conversation by the turning operation of the movable portion 18, the angle detection circuit 71 detects the movable portion 18 returning to the state where its angle is not adjusted as described above.

This muting function produces such an effect of preventing transmission of noise to a partner of telephone conversation when the communication is interrupted.

Also, by making the movable portion 18 again have its angle adjusted, the muting function is released to return a voice to be transmitted to an ordinary level. For ending the call, call ending processing is executed by entering any of operation keys after returning the movable portion 18 to the state where its angle is not adjusted.

Since the above-described portable telephone of the present embodiment allows the unidirectional microphone 20 to be disposed at an arbitrary angle by the adjustment of the angle of the movable portion 18, directing the microphone 20 toward a speaker's mouth during telephone conversation enables effective collection of voices to be transmitted to realize comfortable telephone communication.

Also, the use of a unidirectional microphone enables input of surrounding voices and noise to be suppressed.

Figure 12:
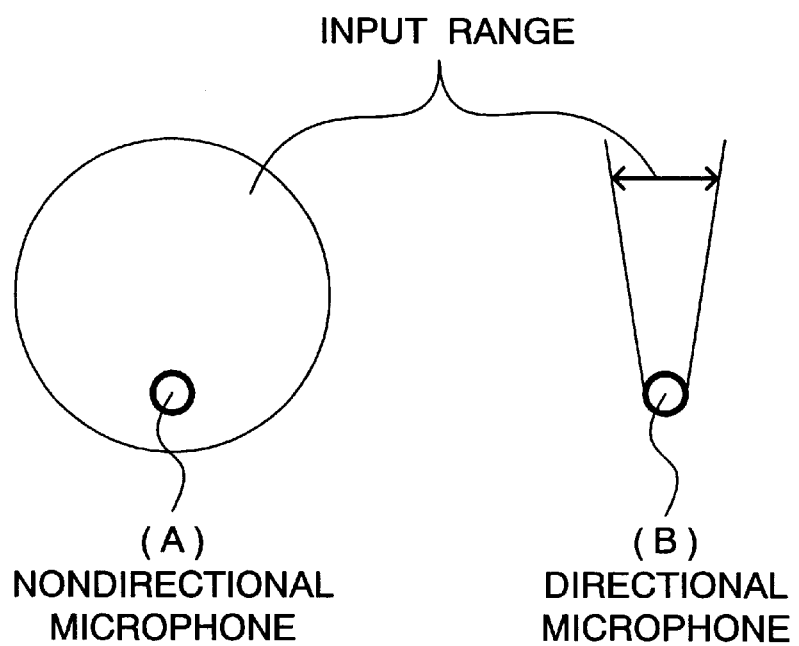
FIG. 12 is an explanatory diagram showing a range of input of a directional microphone and a nondirectional microphone.

FIG. 12 is an explanatory diagram showing a range of input of a directional microphone and a nondirectional microphone. As shown in FIG. 12(A), with a nondirectional microphone, because of its wide input range, surrounding noise etc. other than a voice of a speaker is input, while with a directional microphone, as illustrated in FIG. 12(B), because of its narrow input range, directing the microphone toward the speaker's mouth enables appropriate input of only a voice to be transmitted.

Structuring the portable phone to execute off-hook and turn-on of the microphone 20 and further, muting operation by moving the microphone 20 (i.e. movable portion 18)

saves key operations for these processing, thereby improving operability.

In addition, since the movable portion 18 provided with the microphone 20 will not be drawn largely from the casing 10, damage, for example, caused by the movable portion 18 caught by clothes will not be done, resulting in a portable telephone excellent in durability.

Figure 7:
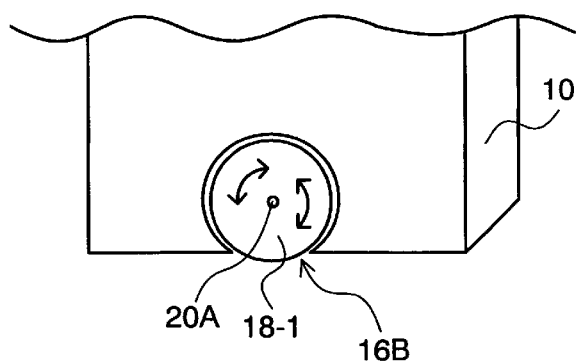
FIG. 7 is a view showing another example of a speech transmission portion (movable portion)

Although the foregoing example has been described with respect to the structure in which the movable portion 18 is displaced by a turn in the two-dimensional direction (horizontal direction), for example, a spherical movable portion 18-1 having the built-in microphone 20 may be attached to the casing 10 by a spherical bearing to realize angle adjustment by a three-dimensional (solid direction) turn as illustrated in FIG. 7.

Figure 8:
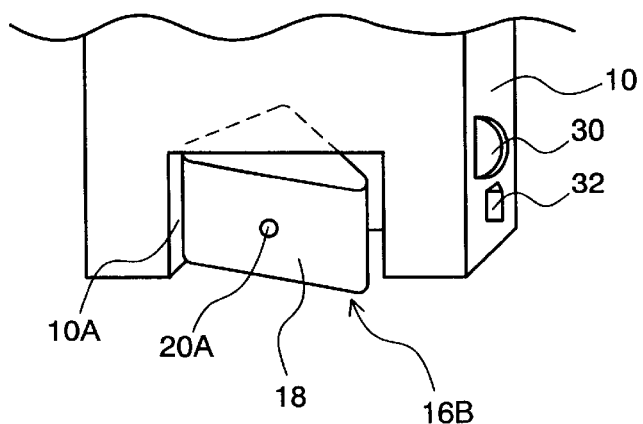
FIG. 8 is a partial perspective view showing a movable portion and its surrounding portion expanded at a portable telephone according to a second embodiment of the present invention.

Next, FIG. 8 is a partial perspective view showing a movable portion and its surrounding portion expanded in a portable telephone according to a second embodiment of the present invention. Components common to those-in the example shown in FIGS. 1 to 5 are given the same reference numerals to omit their description.

While in the above-described first embodiment, the movable portion 18 has its angle adjusted by manual operation, in the second embodiment, a pop-up function is provided which allows the movable portion 18 to be displaced to have a desired angle by one-touch operation.

In FIG. 8, a casing 10 of the portable telephone includes an angle setting dial 30 for setting the angle of the movable portion 18, a displacement mechanism 40 (FIG. 9) for automatically conducing rotational displacement of the movable portion 18 according to the angle set by the angle setting rotary lug 30 and an operation button 32 for executing the displacement mechanism according to user's pressing operation.

Figure 9:
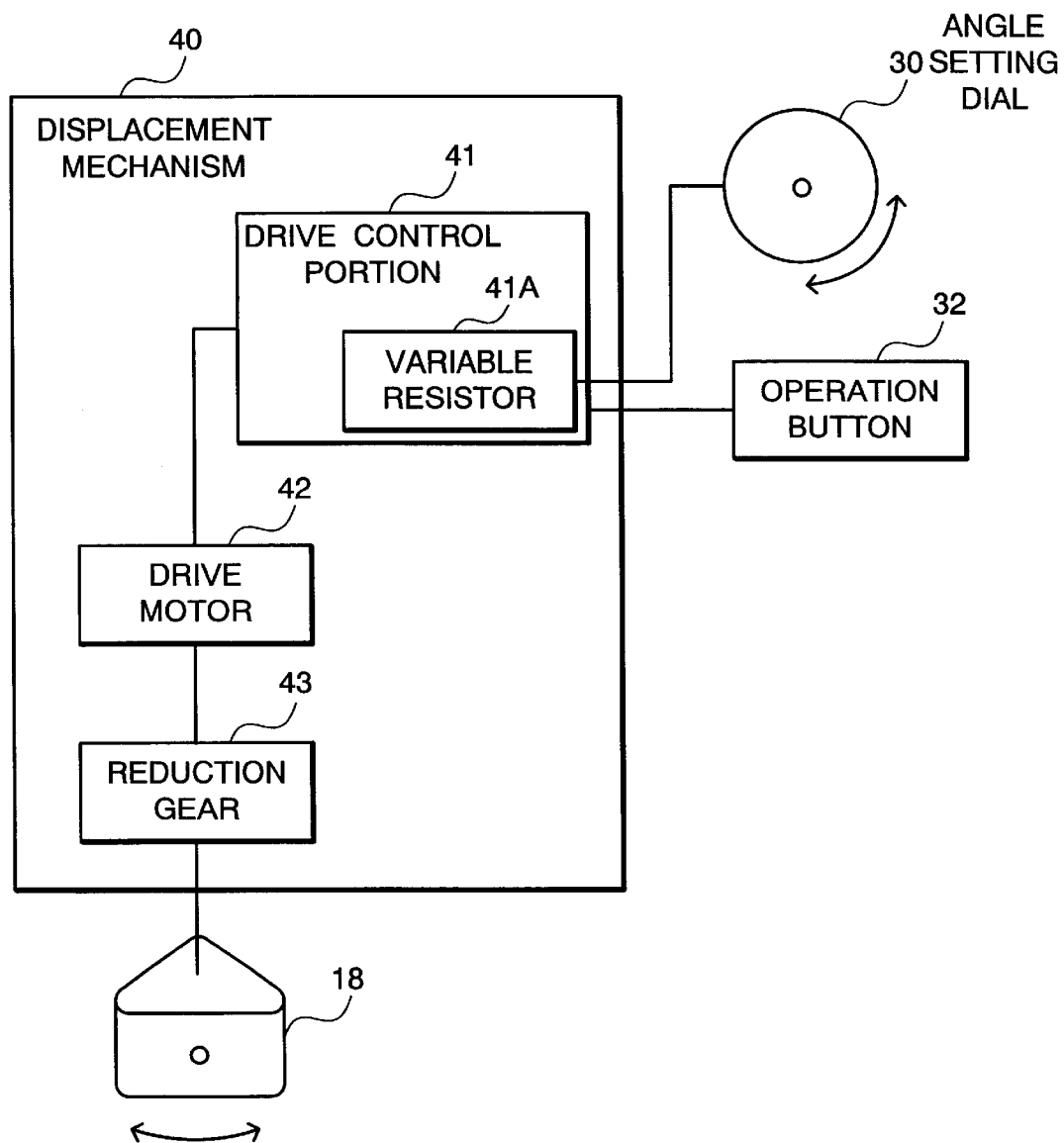
FIG. 9 is a block diagram showing an example of a structure of a displacement mechanism of the second embodiment.

Example of a structure of the above-described displacement mechanism 40 is shown in FIG. 9. In FIG. 9, the displacement mechanism 40 is composed of a drive control portion 41, a drive motor 42, and a reduction gear 43.

The drive control portion 41 is for controlling automatic turn of the movable portion 18 by the drive motor 42, and changing a value of its variable resistor 41A by the operation of the angle setting dial 30 leads to setting of the angle of the movable portion 18 which turns at the press of the operation button 32.

Every time the operation button 32 is pressed, the drive control portion 41 controls the drive motor 42 such that the movable portion 18 turns by an angle set.

The drive motor 42 is connected to a rotary shaft 22 of the movable portion 18 through the reduction gear 43.

As described above, when the variable resistor 41A is operated by the angle setting dial 30, the displacement mechanism 40 reads a resistance value of the variable resistor 41A by means of the drive control portion 41 and controls the drive motor 42 and the reduction gear mechanism 43 which drive a turn of the movable portion 18 according to the value. The displacement mechanism 40 displaces the movable portion 18 by instantaneous operation.

For example, when the operation button 32 is pressed once, the displacement mechanism 40 starts operating to displace the movable portion 18 by a set angle (angle being adjusted). When the operation button 32 is again pressed, the displacement mechanism 40 starts operating to displace the movable portion 18 from the state where the angle is being adjusted to the state where the same is not being adjusted.

Such a structure as described in the second embodiment enables a portable telephone more excellent in operability to be provided. Structure of the displacement mechanism 40 is not limited to an electrical mechanism using the drive motor 42 but may be a mechanical one in which, for example, the movable portion 18 is displaced to have its angle adjusted by using a torque of a return coil spring and is returned to the original position by manual operation.

Figure 10:
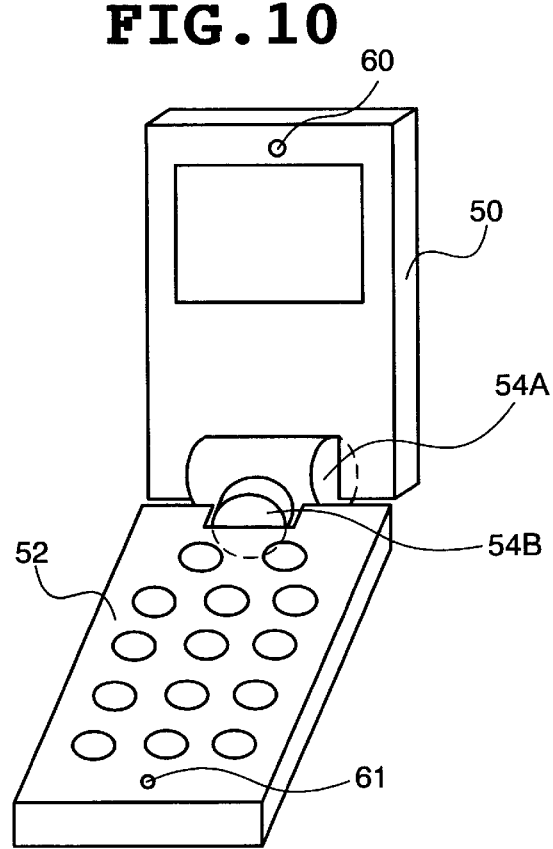
FIG. 10 is a perspective view showing an example of an application of the present invention to a folding portable telephone.
Figure 11:
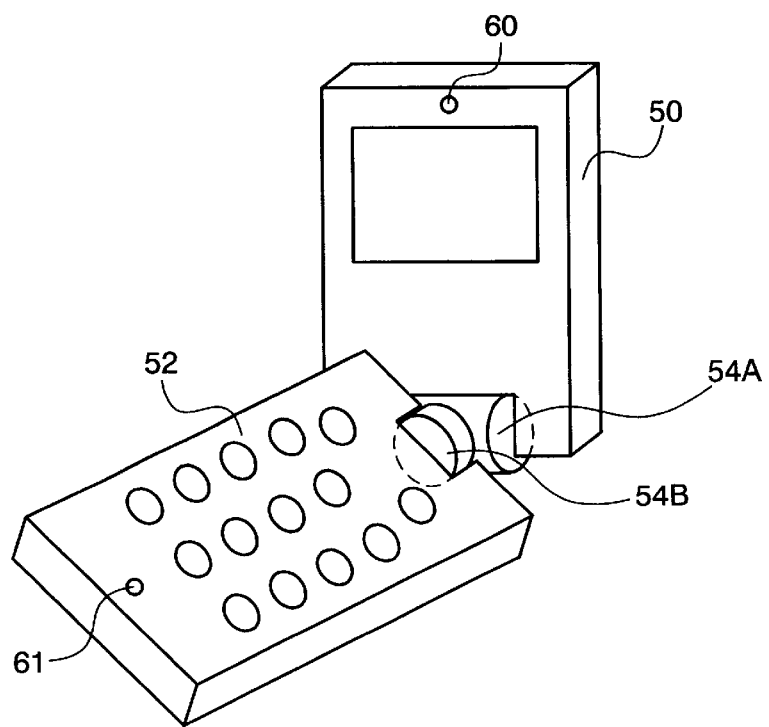
FIG. 11 is a perspective view showing a state of a casing turned to the backward direction in the application example of FIG. 10.

FIGS. 10 and 11 are perspective views showing an example of an application of the present invention to a folding portable telephone.

In the present portable telephone, two casings 50 and 52 of the same configuration are disposed to open and close with a hinge portion 54A provided therebetween, with a speech reception portion 60 provided on one casing 50 and a speech transmission portion 61 on the other casing 52. Here, the hinge portion 54A is an axis which allows the casings 50 and 52 to turn to open and close to each other.

In addition, the other casing 52 is turnably pivoted on the hinge portion 54A by means of a rotary shaft 54B which rotates in a backward direction around the axis orthogonal to a rotation axis of the hinge portion 54A.

With this arrangement, operation of turning the other casing 52 to the backward direction enables the speech transmission portion 61 (microphone) provided on this casing 52 to face toward a speaker's mouth for conducting telephone conversation.

Also with this portable telephone, at the stage of opening the casing 52, processing such as off-hook is executed. The same structure can be applied to a portable telephone called flip phone in which only a microphone portion is opened.

As described in the foregoing, according to the portable telephone of the present invention, adjustment of an angle of a speech transmission portion is enabled in a portable telephone having an integral casing to realize telephone conversation with a microphone facing toward a speaker's mouth.

It is therefore possible to provide a portable telephone having an integral casing with a structure which enables efficient input of a voice to be transmitted even when a speech transmission portion is not allowed to adhere to a mouth, thereby enabling comfortable telephone communication and which involves less breakage etc.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A portable telephone formed of an integral casing, comprising:
  a speech reception portion provided in proximity to one end portion of said casing, and a speech transmission portion provided in proximity to the other end portion of said casing,
  said speech transmission portion including a movable portion having a unidirectional microphone therein and provided within a concavity in said casing on a common surface of said casing with said speech reception portion, said speech transmission portion being disposed to have a user selectable angle, among a plurality of angles in a horizontal direction about an axis in a direction generally vertically between said one end portion and said other end portion, adjustable with respect to said casing.

2. The portable telephone as set forth in claim 1, wherein the angle adjustment of said movable portion causes said microphone to face toward a speaker's mouth.

3. The portable telephone as set forth in claim 1, wherein with no adjustment made of an angle, said movable portion is disposed to have its outer surface substantially flush with an outer surface of said casing so as to cover said concavity.

4. The portable telephone as set forth in claim 1, wherein a brake mechanism is provided which brakes a turn of said movable portion at the time of adjustment of the angle of said movable portion.

5. The portable telephone set as set forth in claim 1, further comprising
 a speech transmission signal turn-on means for detecting an angle adjustment being made of said movable portion whose angle has not been adjusted to turn on a transmission line of a speech transmission signal from said microphone.

6. The portable telephone set as set forth in claim 1, further comprising
 off-hook means for detecting an angle adjustment being made of said movable portion whose angle has not been adjusted to connect a radio line off the hook.

7. The portable telephone set as set forth in claim 1, further comprising,
 muting means for suppressing the level of a voice to be transmitted when after an angle adjustment of said movable portion makes a radio line be connected off the hook to start telephone communication, said movable portion is returned to have its angle not adjusted.

8. The portable telephone set as set forth in claim 1, further comprising
 a displacement mechanism for displacing said movable portion by a set angle of turn.

9. The portable telephone set as set forth in claim 8, further comprising
 an operation portion for activating said displacement mechanism to displace said movable portion.

10. The portable telephone as set forth in claim 1 wherein said speech transmission portion is configured in block form.

11. The portable telephone as set forth in claim 1 wherein said speech transmission portion is attached to said casing with a spherical bearing and adjustable in a three-dimensional angle.

12. The portable telephone as set forth in claim 1 wherein said speech transmission portion is turnable on a rotary shaft provided vertically in said integral casing.

13. The portable telephone as set forth in claim 1 wherein said speech transmission portion is adjustable on an axis orthogonal to a rotation axis of a hinge.

14. A portable telephone formed of an integral casing comprising:
 a speech reception portion provided in proximity to one end portion of said casing, and a speech transmission portion provided in proximity to the other end portion of said casing,
 said speech transmission portion including a movable portion having a unidirectional microphone therein which portion is disposed to have an angle adjustable with respect to said casing, and
 a brake mechanism which brakes a turn of said movable portion at the time of adjustment of the angle of said movable portion, wherein said brake mechanism includes:
  a plurality of engagement claws formed at fixed spacing in the direction of rotation around the axis at the rotational center provided in said movable portion,
  a stopper provided movably in the direction in which the stopper comes close to and goes away from any of said plurality of engagement claws provided on said casing side, and
  energizing means for energizing said stopper to the direction of engagement with said engagement claws.

15. The portable telephone as set forth in claim 14 wherein said speech transmission portion is attached to said casing with a spherical bearing and adjustable in a three-dimensional angle.

16. The portable telephone as set forth in claim 14 wherein said speech transmission portion is turnable on a rotary shaft provided vertically in said integral casing.

17. The portable telephone as set forth in claim 14 wherein said speech transmission portion is adjustable on an axis orthogonal to a rotation axis of a hinge.

18. A portable telephone formed of an integral casing comprising:
 a speech reception portion provided in proximity to one end portion of said casing, and a speech transmission portion provided in proximity to the other end portion of said casing,
 said speech transmission portion including a movable portion having a unidirectional microphone therein which portion is disposed to have an angle adjustable with respect to said casing, and
 a displacement mechanism for displacing said movable portion by a set angle of turn, wherein said displacement mechanism includes:
  driving means connected to a rotary shaft of said movable portion to turn said movable portion, and
  control means for controlling a turn of said driving means based on a set value of a set angle.

19. A portable telephone formed of an integral casing comprising:
 a speech reception portion provided in proximity to one end portion of said casing, and a speech transmission portion provided in proximity to the other end portion of said casing,
 said speech transmission portion including a movable portion having a unidirectional microphone therein which portion is disposed to have an angle adjustable with respect to said casing,
 a displacement mechanism for displacing said movable portion by a set angle of turn,
 a first operation portion for setting an angle of turn of said movable portion for said displacement mechanism, and
 a second operation portion for activating said displacement mechanism to displace said movable portion,
 said displacement mechanism including driving means connected to a rotary shaft of said movable portion to turn said movable portion, and control means having setting means whose angle of turn is set by said first operation means to control a turn of said driving means based on a ser value of said setting means.

20. A portable telephone having a folding casing, wherein two casings are disposed to open and close with a hinge portion provided therebetween,
 a speech reception portion is provided on one casing and a speech transmission portion is provided on the other casing, and
 said one casing is turnably pivoted on said hinge portion by means of a rotary shaft which rotates in a backward direction around the axis orthogonal to a rotation axis of said hinge portion to a user selectable angle, among a plurality of angles.

* * * * *